April 28, 1959     D. E. GOMMEL     2,883,872

CHANGE SPEED TRANSMISSION

Filed May 7, 1956

Inventor:
Dewey E. Gommel
By: Frank C. Parker
Atty.

2,883,872
Patented Apr. 28, 1959

2,883,872

CHANGE SPEED TRANSMISSION

Dewey E. Gommel, Indianapolis, Ind., assignor to Borg-Warner Corporation, Chicago, Ill., a corporation of Illinois Application May 7, 1956, Serial No. 583,172

9 Claims. (Cl. 74—336)

The present invention relates in general to transmissions and is particularly concerned with transmissions suitable for use with portable power operated tools, such as wood cutting chain saws.

It is conventional practice to utilize small electric motors or gasoline engines as the source of power for portable power tools such as chain saws and under normal circumstances the electric motor or gasoline engine used for this purpose functions most efficiently at a relatively constant speed. Quite frequently, due to different conditions under which the tool is required to operate, it is desirable to drive the tool at different speeds. With most chain saws on the market today, which are powered by an electric motor, they are driven at a substantially constant speed. In the tools which are powered by a gasoline engine, the engine can be throttled down in order to drive the tool at a lower speed, but when the engine is so throttled, it some times does not afford sufficient power to operate the tool satisfactorily.

As will be understood, it is always desirable to run chain saws at the highest speed possible in order to obtain the fastest speed of sawing. The engine and clutch are powerful enough to operate the chain at top speed in light cuts on small diameter logs and limbs and soft woods. On the larger logs and hard woods the engine will stall and the clutch will slip at the top speeds because they are not built large enough to deliver the necessary power. Also the chain saw unit is made as light in weight as possible to ease the handling of the unit. The present invention overcomes these weaknesses of the small engine and clutch with their limited capacities by adding a second gear ratio which can be used by a shift lever movement. This second gear ratio maintains the high speed of the engine and clutch but reduces the speed of the chain by one-half or more. This increases the power delivered to the chain. The chain speed may be reduced but the engine does not stall and the clutch does not slip at the new reduced chain speed. The higher speeds of the engine develops more power per pound of weight and the higher speeds of the chain enables more wood to be cut per day.

Some chain saw unit manufacturers make it possible to replace the transmission gears by removing the gear case cover and installing a new set of gears but this takes time and it is not easy to change from one speed to the other and then back again to the first speed. This invention makes it very easy to change to the gear ratio desired by simply idling the engine for a moment and flipping the gear shift lever over to the desired position and chain speed.

It is, therefore, a principal object of the present invention to provide a change speed transmission adapted to be operably disposed between the power source and the driving sprocket of a power driven tool, such as a chain saw.

A more particular object of the present invention is to provide a change speed transmission for use with portable chain saws or other portable power tools which provides two different driving ratios between the driving engine and the chain saw driving sprocket.

A still further object of the present invention is to provide a change speed transmission for a chain saw which transmission utilizes a centrifugal clutch for completing the driving ratio, which is selected in the transmission, only when the transmission input shaft rotates above a predetermined speed of rotation. In this connection, the centrifugal clutch mechanism includes a shiftable drum affixed to a pair of slidable transmission gears, with a plurality of clutch shoes being carried by the drive shaft and which clutch shoes are adapted to be thrown outwardly by centrifugal force in order to engage the clutch drum and in turn complete the selected driving ratio through the transmission.

An advantage of utilizing the transmission arrangement contemplated by the present invention resides in the fact that when the clutch shoes frictionally engage the drum, due to centrifugal force, it is practically impossible to manually shift the transmission gears. This prevents the disestablishment of a driving ratio through the transmission for so long as the transmission drive shaft is operating above a predetermined speed of rotation and insures that for so long as the driving shaft is operating at less than said predetermined speed of rotation, the transmission will be in "neutral" with no drive being completed to the transmission driven shaft or output driving sprocket thereon.

The foregoing objects and advantages of the present invention as well as others will become more apparent when the following detailed description is read in conjunction with the accompanying drawings, wherein.

Figure 1:
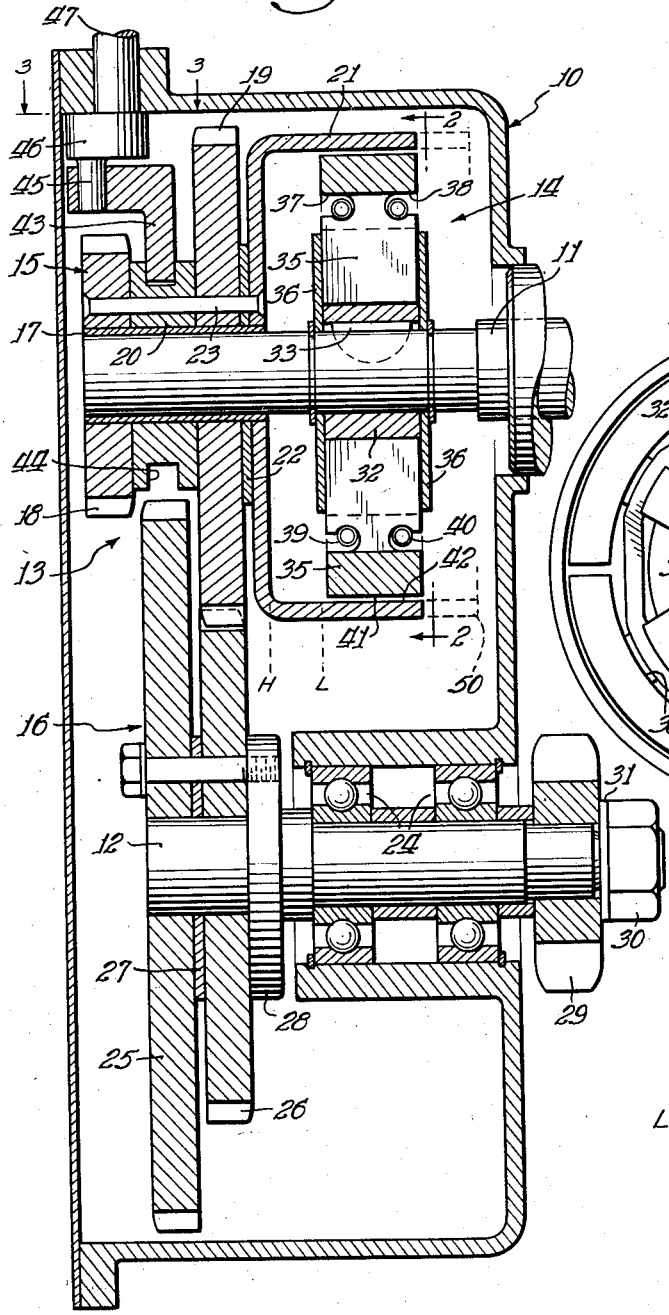
Fig. 1 is a side elevational view, shown partly in section, and illustrating the principal features of the present invention.
Figure 2:
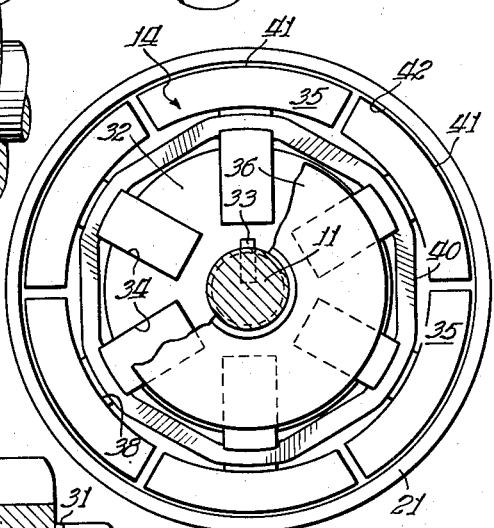
Fig. 2 is a sectional view taken substantially along the line 2—2 of Fig. 1 and showing the details of construction of the centrifugal clutch mechanism utilized in the transmission.

With reference now to the drawings, wherein like reference numerals are utilized in the different views to identify identical parts, the transmission comprising the subject matter of the present invention is housed within a suitable casing, designated generally by reference numeral 10. The transmission itself comprises a drive shaft 11, which may be rotatably mounted within the casing 10 by any suitable bearings (not shown), a driven shaft 12, gearing designated generally by reference numeral 13 and a centrifugal clutch mechanism, designated generally by reference numeral 14.

The gearing 13 comprises a pair of gear clusters 15 and 16. The gear cluster 15 is rotatably mounted on drive shaft 11 by means of a suitable sleeve bearing 17 and the gear cluster 15 comprises a low speed gear 18 and a high speed gear 19 which are spaced from one another by means of a shift collar 20. Also fixed to the gear cluster 15 is a substantially cylindrical driven clutch drum 21 which comprises the driven element of the centrifugal clutch 14 and the clutch drum 21 is disposed in spaced relation to gear 19 by means of a suitable spacer washer 22. The gears 18 and 19, shift collar 20 and driven clutch drum 21 are held together in assembly with each other by means of a plurality of pins 23 which may be riveted over at their ends, as shown.

The driven shaft 12 is disclosed as being rotatably mounted within casing 10 by means of a plurality of ball bearing elements 24. The gear cluster 16 comprises a low speed gear 25 and a high speed gear 26 both of which are mounted on shaft 12 and held in slidably spaced relationship with respect to each other by means of a spacer washer 27. The gears 25 and 26 are fixed to a radially extending flange 28 integrally formed on shaft 12 so that the gear cluster 16 and shaft 12 rotate as a unit. In order to provide means for transferring the drive from shaft 12 to some tool being driven by the transmission, a suitable driving sprocket 29 is mounted on shaft 12, externally with respect to casing 10, and is held fixed to shaft 12 by means of a suitable threated nut 30 which presses a lock washer 31 against the driving sprocket 29.

The centrifugal clutch 14 comprises a hub 32 which is secured to shaft 11 by means of a key 33. The hub 32 is provided with a plurality of radially outwardly extending openings or guideways 34, with a corresponding number of friction clutch shoes 35 being respectively mounted within said guideways 34. A pair of suitable stop washers 36, respectively disposed on either side of hub 32 function to prevent axial displacement of the clutch shoes 35 out of the guideways 34. Each of the clutch shoes 35 is provided with grooves 37 and 38 on opposite sides thereof and a pair of garter springs 39 and 40 are respectively disposed around the hub 32 and within the grooves 37 and 38 in each of the shoes 35. The garter springs 39 and 40 are under a predetermined tension and function to resiliently urge the shoes 35 radially inwardly. Each of the shoes 35 is provided with a cylindrical external surface 41 concentric with the inner surface 42 of driven clutch drum 21. When the driven shaft 11 rotates at a predetermined speed, or faster, centrifugal force acting on shoes 35 overcomes the radially inwardly directed force exerted by springs 39 and 40 and the shoes 35 are thrown outwardly into frictional engagement with the inner periphery of driven clutch drum 21 in order to complete a drive from drive shaft 11 to gear cluster 15.

As stated previously, the gear cluster 15 is fixed to driven clutch drum 21 and suitable means are provided for manually shifting the gear cluster 15 from the position shown, wherein high speed gears 19 and 26 are in mesh, to the right, in order to disengage gear 19 from gear 26 and effect engagement of low speed gears 18 and 25. This manually operable shift mechanism will now be described and it comprises a shift fork 43 which is disposed within a groove 44 formed around shift collar 20, with the shift fork 43 having a suitable aperture adapted for receiving a pin 45 mounted on the under side of an eccentric 46. The eccentric 46 is disposed on the bottom end of a shaft 47 journalled within a suitable opening in the transmission casing 10 and secured to the shaft 47 is a lever 48 having a handle 49 at the other end thereof.

Figure 3:
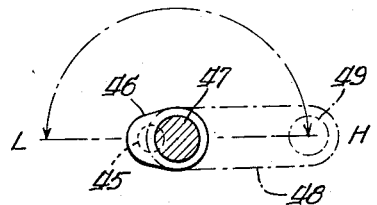
Fig. 3 is a detail view illustrating the shift lever for manually selecting the different driving ratios provided by the transmission.

When the handle 49 is rotated through the arc shown in Fig. 3, the eccentric 46 rotates through approximately 180° and this causes shift fork 43 and gear cluster 15 to be moved from the high speed position to the low speed position. The clutch drum 21 is movable with the gear cluster 15 to the dotted position, as indicated by reference numeral 50.

In the operation of the present transmission the drive shaft 11 is motor driven and the friction clutch shoes 35 are carried by shaft 11. For so long as shaft 11 is rotating below a predetermined speed of rotation, the garter springs 39 and 40 exert a sufficient bias on the shoes 35 to hold them disengaged from clutch drum 21. Under these conditions, the manually operable shift lever 48 may be moved between its high and low speed positions to effect meshing engagement of either the high speed gears 19 and 26 or the low speed gears 18 and 25. Upon establishment of the desired gear ratio by manipulation of the shift lever 48, the driving engine or motor speed is then increased and this causes the friction clutch shoes 35 to be thrown outwardly due to the effect of centrifugal force acting thereon in opposition to the biasing force exerted by the garter springs 39 and 40. When the friction shoes 35 engage the inner periphery of the drum 42 with sufficient force to transmit a drive to the drum, it is then practically impossible to shift the gear cluster 15 by the handle 49 from the position which it occupies at the time the shoes 35 engage the drum 21. Thus, it is apparent that the centrifugal clutch 14 includes means for providing a neutral condition at low speeds of the drive shaft 11 and above a predetermined speed of rotation of the drive shaft 11 the centrifugal clutch 14 is effective to prevent the disestablishment of an established driving ratio either accidentally or otherwise.

It is contemplated that numerous specific changes may be made in the present invention without departing from the spirit or scope thereof.

What is claimed is:

1. In a transmission, a drive shaft, a driven shaft, change speed gearing drivingly interconnecting said shafts and including a pair of gear clusters respectively associated with said shafts, one of said gear clusters being fixedly mounted on one of said shafts and the other of said gear clusters being rotatably and slidably mounted on the other of said shafts, said rotatably and slidably mounted gear cluster being selectively slidable into different positions in order to bring the gears thereof selectively into meshing engagement with the gears of said fixedly mounted gear cluster, and centrifugal clutch means automatically engageable above a predetermined speed of rotation for drivingly connecting said rotatably mounted gear cluster with said drive shaft and thereby completing a drive between said shafts through the selectively meshingly engaged cluster gears.

2. In a transmission, a drive shaft, a driven shaft, change speed gearing drivingly interconnecting said shafts and including a plurality of gears respectively associated with said shafts, said gears associated with one of the shafts being fixedly mounted thereon and the gears associated with the other shaft being rotatably and slidably mounted thereon, said rotatably and slidably mounted gears being selectively slidable into meshing engagement with the gears fixedly mounted on said one shaft, centrifugal clutch means automatically engageable above a predetermined speed of rotation for drivingly connecting said rotatably mounted gears with said drive shaft and thereby completing a drive between said shafts through the selectively meshingly engaged gears.

3. In a transmission, a drive shaft, a driven shaft, change speed gearing drivingly interconnecting said shafts and including a pair of gear clusters respectively associated with said shafts, one of said gear clusters being fixedly mounted on one of said shafts and the other of said gear clusters being rotatably and slidably mounted on the other of said shafts, said rotatably and slidably mounted gear cluster being selectively slidable into different positions in order to bring the gears thereof selectively into meshing engagement with the gears of said fixedly mounted gear cluster, centrifugal clutch means automatically engageable above a predetermined speed of rotation for drivingly connecting said rotatably mounted gear cluster with said drive shaft and thereby completing a drive between said shafts through the selectively meshingly engaged cluster gears, and said centrifugal clutch means including a portion fixedly connected with said slidable gear cluster and effective to prevent sliding movement of said slidable gear cluster upon engagement of said centrifugal clutch means.

4. In a transmission, a drive shaft, a driven shaft, change speed gearing drivingly interconnecting said shafts and including a pair of gear clusters respectively associated with said shafts, one of said gear clusters being fixedly mounted on one of said shafts and the other of said gear clusters being rotatably and slidably mounted on the other of said shafts, said rotatably and slidably mounted gear cluster being selectively slidable into different positions in order to bring the gears thereof selectively into meshing engagement with the gears of said fixedly mounted gear cluster, and centrifugal clutch means comprising a drum affixed to said slidably and rotatably mounted gear cluster and a plurality of radially slidable shoes supported in a hub on said drive shaft and automatically engageable with said drum above a predetermined speed of rotation of said shoes for drivingly connecting said rotatably mounted gear cluster with said drive shaft and thereby completing a drive between said shafts through the selectively meshingly engaged cluster gears.

5. In a transmission, a drive shaft, a driven shaft, change speed gearing drivingly interconnecting said shafts and including a pair of gear clusters respectively associated with said shafts, one of said gear clusters being fixedly mounted on one of said shafts and the other of said gear clusters being rotatably and slidably mounted on the other of said shafts, said rotatably and slidably mounted gear cluster being selectively slidable into different positions in order to bring the gears thereof selectively into meshing engagement with the gears of said fixedly mounted gear cluster, and centrifugal clutch means comprising a drum affixed to said slidably and rotatably mounted gear cluster and a plurality of radially slidable shoes supported in a hub on said drive shaft and automatically frictionally engageable with said drum above a predetermined speed of rotation of said shoes for drivingly connecting said rotatably mounted gear cluster with said drive shaft and thereby completing a drive between said shafts through the selectively meshingly engaged cluster gears, whereby the force of frictional engagement between said drum and said shoes is effective to prevent sliding movement of said slidable gear cluster which thereby insures the continued meshing engagement of the selectively engaged gears.

6. In a transmission, a drive shaft, a driven shaft, change speed gearing drivingly interconnecting said shafts and including a first pair of gears fixedly mounted on one of said shafts and a second pair of gears rotatably and slidably mounted on the other of said shafts, said rotatably and slidably mounted pair of gears being selectively slidable into different positions in order to selectively bring them into meshing engagement with the fixedly mounted gears to respectively establish relatively low and high ratio power trains between said shafts, and centrifugal clutch means automatically engageable above a predetermined speed of rotation for drivingly connecting said slidably and rotatably mounted pair of gears with said drive shaft and thereby completing the established power train between said shafts through the selectively meshingly engaged gears.

7. A change speed transmission comprising a drive shaft, a driven shaft, change speed gearing including a pair of gear clusters respectively mounted on said drive and driven shafts, means fixedly connecting the gear cluster mounted on said driven shaft to said driven shaft, the gear cluster mounted on said drive shaft being rotatable with respect to the drive shaft and slidable thereon selectively into different positions for respectively establishing meshing engagement with the gears of the cluster mounted on said driven shaft so as to establish different driving ratios between said shafts, and centrifugal clutch means including a driving portion fixed on said drive shaft, a drum fixed to said slidable gear cluster and movable therewith, and a plurality of radially slidable shoes mounted within guideways formed in said driving portion and resiliently biased radially inwardly to a disengaged position with relation to said drum, the centrifugal force acting on said shoes being sufficient above a predetermined speed of rotation of said drive shaft to establish frictional driving engagement with said drum to complete the selected driving ratio between said shafts.

8. A change speed transmission comprising a drive shaft, a driven shaft, change speed gearing including a pair of gear clusters respectively mounted on said drive and driven shafts, means fixedly connecting the gear cluster mounted on said driven shaft to said driven shaft, the gear cluster mounted on said drive shaft being rotatable with respect to the drive shaft and slidable thereon selectively into different positions for respectively establishing meshing engagement with the gears of the cluster mounted on said driven shaft so as to establish different driving ratios between said shafts, and ugal clutch means including a driving portion fixed on said drive shaft, a drum fixed to said slidable gear cluster and movable therewith, and a plurality of radially slidable shoes mounted within guideways formed in said driving portion and resiliently biased radially inwardly to a disengaged position with relation to said drum, the centrifugal force acting on said shoes being sufficient above a predetermined speed of rotation of said drive shaft to establish frictional driving engagement with said drum to complete the selected driving ratio between said shafts, and manually operable means for selectively moving said slidable gear cluster into its different positions.

9. A change speed transmission comprising a drive shaft, a driven shaft, change speed gearing including a pair of gear clusters respectively mounted on said drive and driven shafts, means fixedly connecting the gear cluster mounted on said driven shaft to said driven shaft, the gear cluster mounted on said drive shaft being rotatable with respect to the drive shaft and slidable thereon selectively into different positions for respectively establishing meshing engagement with the gears of the cluster mounted on said driven shaft so as to establish different driving ratios between said shafts, and ugal clutch means including a driving portion fixed on said drive shaft, a drum fixed to said slidable gear cluster and movable therewith, and a plurality of radially slidable shoes mounted within guideways formed in said driving portion and resiliently biased radially inwardly to a disengaged position with relation to said drum, the centrifugal force acting on said shoes being sufficient above a predetermined speed of rotation of said drive shaft to establish frictional driving engagement with said drum to complete the selected driving ratio between said shafts, and manually operable means for selectively moving said slidable gear cluster into its different positions, the frictional engagement between said shoes and drum being effective to prevent sliding movement of the slidable gear cluster and thus prevent selection of a different driving ratio while a drive is established between the shafts.

References Cited in the file of this patent

UNITED STATES PATENTS

| | | |
|---|---|---|
| 2,455,481 | Harris | Dec. 7, 1948 |
| 2,587,004 | Siegrist | Feb. 26, 1952 |

FOREIGN PATENTS

| | | |
|---|---|---|
| 788,405 | France | July 29, 1935 |

UNITED STATES PATENT OFFICE

CERTIFICATE OF CORRECTION

Patent No. 2,883,872                                                            April 28, 1959

Dewey E. Gommel

It is hereby certified that error appears in the printed specification of the above numbered patent requiring correction and that the said Letters Patent should read as corrected below.

Column 6, lines 16 and 39, strike out "and" and insert -- centrif- --.

Signed and sealed this 8th day of September 1959.

(SEAL)
Attest:

KARL H. AXLINE                                                   ROBERT C. WATSON
Attesting Officer                                         Commissioner of Patents